United States Patent [19]

Eickmann

[11] Patent Number: 4,703,906

[45] Date of Patent: Nov. 3, 1987

[54] AIRBORNE CRAFT WITH AN INCLINABLE UPPER STRUCTURE

[76] Inventor: Karl Eickmann, 2420 Isshiki, Hayama-machi, Kanagawa-ken, Japan

[21] Appl. No.: 621,638

[22] Filed: Jun. 18, 1984

Related U.S. Application Data

[60] Division of Ser. No. 243,324, Mar. 13, 1981, Pat. No. 4,456,430, and a continuation-in-part of Ser. No. 610,872, Sep. 8, 1975, and Ser. No. 610,871, Sep. 8, 1975, said Ser. No. 610,872, and Ser. No. 610,871, each is a division of Ser. No. 416,237, Nov. 15, 1973, abandoned, which is a division of Ser. No. 131,782, Apr. 6, 1971, Pat. No. 3,790,105, said Ser. No. 243,324, is a continuation-in-part of Ser. No. 110,157, Jan. 7, 1980, and Ser. No. 954,555, Oct. 25, 1978, Pat. No. 4,358,073, which is a continuation-in-part of Ser. No. 800,756, May 26, 1977, abandoned, which is a continuation-in-part of Ser. No. 465,413, Apr. 30, 1974, abandoned, said Ser. No. 110,157, is a continuation-in-part of Ser. No. 895,687, Apr. 12, 1978, abandoned, which is a continuation-in-part of Ser. No. 760,006, Jan. 17, 1977, Pat. No. 4,136,845, which is a continuation-in-part of Ser. No. 104,676, Mar. 8, 1971, Pat. No. 3,823,898.

[51] Int. Cl.$^4$ .................. B64C 27/08; B64C 27/52
[52] U.S. Cl. .................. 244/17.23; 244/17.25; 244/56
[58] Field of Search .................. 244/17.23, 17.25, 60, 244/56, 12.1, 12.4; 91/492, 474; 418/210

[56] References Cited

U.S. PATENT DOCUMENTS 1,351,821  9/1920  Wilkinson .................. 244/17.23
1,974,961  9/1934  Johnson .................. 91/492
2,514,639  7/1950  Haack .................. 244/56
2,514,822  7/1950  Wolfe, Jr. .................. 244/17.23

Primary Examiner—Galen Barefoot

[57] ABSTRACT

In a vehicle or device a fluid motor is employed to drive rotary members, such as wheels, propellers, tracks. The motor is provided with an arrangement which includes a control means and an axially moveable member. By utilizing the control means, for example, by a flow of fluid, the axially moveable member is used to apply an action, which is not common to the usual operation of fluid motors. The arrangement may be used to arrest the rotor of the motor from rotation when no pressure is in the driving fluid line. It may also be used to control the pitch of propellers with variable pitch arrangements. Also possible is to use the arrangement to automatically obtain an auto-rotation of rotor blades on vertical axes of vertically take off and landing vehicles, when the pressure in the fluid line to the motors for driving the motors drops below a predetermined minimum of pressure. The speciality of the preferred embodiment of the invention is to provide an upper structure of an airborne craft with a plurality of propellers with substantially vertical axes to carry pivotable on the mentioned structure a body of the craft below the mentioned structure, while the body contains the cabine and the power plant as well as the fluid flow supply means, the upper structure is pivotable in a limited extend relative to the body and the fluid under pressure is transferred from the fluid flow supply means in the body to the upper structure and to the fluid motors which drive the propellers of the upper structure.

6 Claims, 12 Drawing Figures

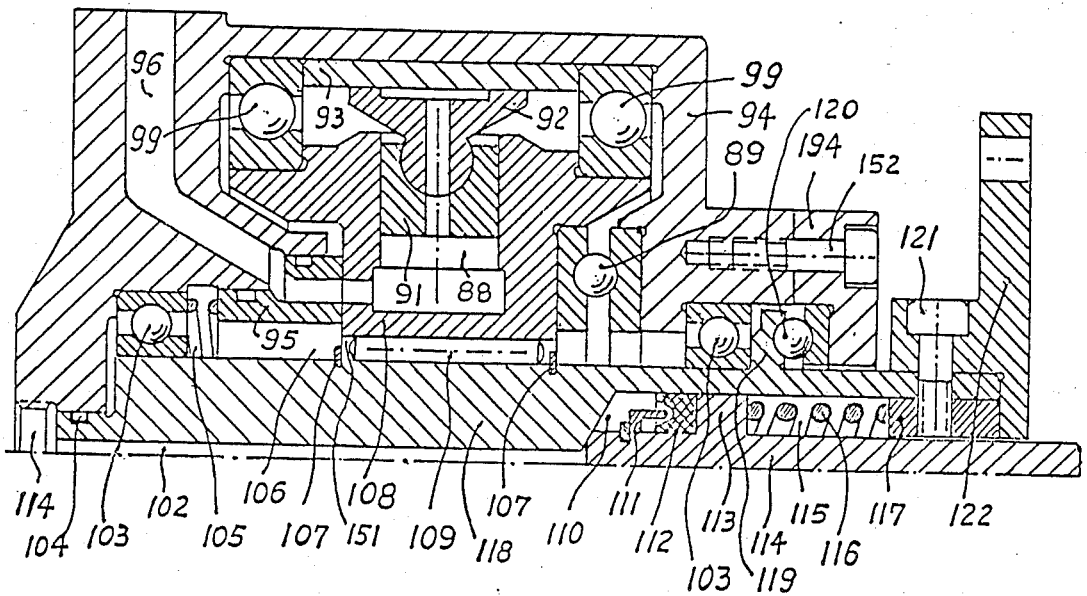
Fig. 4
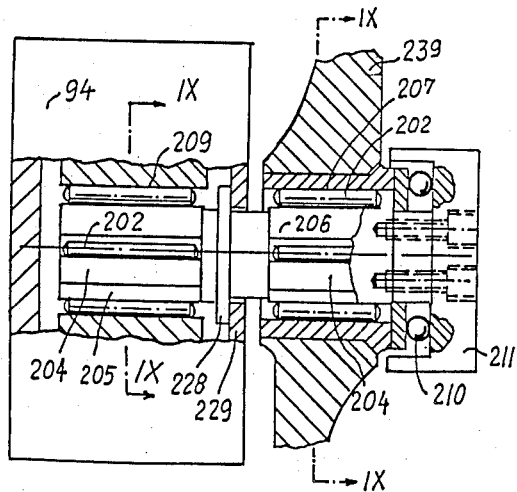
Fig. 5
Fig. 6

AIRBORNE CRAFT WITH AN INCLINABLE UPPER STRUCTURE

REFERENCE TO RELATED APPLICATIONS

This is a divisional application of my co-pending patent application Ser. No. 243,324 which was filed on Mar. 13, 1981, now U.S. Pat. No. 4,456,430. Application Ser. No. 243,324 is a continuation in part application of my earlier application Ser. No. 954,555 which was filed on Oct. 25, 1978 and is now U.S. Pat. No. 4,358,073 and also a continuation in part application of my earlier patent application Ser. No. 110,157, filed on Jan. 7, 1980. The mentioned earlier application Ser. No. 954,555 was a continuation in part application of Ser. No. 800,756, filed on May 26, 1977, now abandoned, and said application Ser. No. 800,756 was a continuation in part application of the earlier application Ser. No. 465,413, now abandoned, filed on Apr. 30, 1974, under title: "Vehicle for travelling in the air and on the ground equipped with hydraulically driven propellers"; and this is partially also a continuation in part application of my earlier patent applications Ser. No. 610,872, now abandoned, of Sept. 8, 1975, entitled: "Hydraulically controlled fluid stream driven vehicle" and Ser. No. 610,871 of Sept. 8, 1975, entitled: "Hydraulically controlled fluid stream driven vehicle" whereof the latter two patent applications are divisinals of former patent application Ser. No. 416,237, filed on Nov. 15, 1973, now abandoned and which was a divisional patent application of patent application Ser. No. 131,782 of Apr. 6, 1971, now U.S. Pat. No. 3,790,105, issued on Feb. 5, 1974, whereby benefit for this present divisional patent application is claimed of Apr. 6, 1971; Nov. 15, 1973; Apr. 30, 1974; Sept. 8, 1975; May 26, 1977; and of Jan. 7, 1980.

The above mentioned application Ser. No. 110,157 was a continuation in part application of Ser. No. 895,687, filed Apr. 12, 1978, now abandoned.

Application Ser. No. 895,687 was a continuation in part application of my earlier application Ser. No. 760,006, filed on Jan. 17, 1977. Application Ser. No. 760,006 is now U.S. Pat. No. 4,136,845 and issued on Jan. 30, 1979. Application Ser. No. 895,687 is now abandoned. Application Ser. No. 760,006 was a continuation in part application of my still earlier application Ser. No. 104,676, filed on Mar. 8, 1971, now U.S. Pat. No. 3,823,898.

Application Ser. No. 104,676 itself arrived from earlier applications, which are mentioned in now granted U.S. Pat. No. 3,823,898. The eldest application therein is application Ser. No. 328,395 of Dec. 5, 1963, now U.S. Pat. No. 3,220,898. Another important application therein is application Ser. No. 551,023 of May 18, 1966, now abandoned. Priority for the equalness of rates of flow in flows to hydraulic motors which drive propellers, is thereby substantiated by application Ser. No. 328,395 of Dec. 5, 1963, and the benefit for the use of such drive to propeller vehicles forward and maintain their straight forward path by equally driven propeller pairs which one propeller of each pair on another side of the vehicle is obtained by application Ser. No. 551,023 of May 18, 1966.

Partial benefit is thereby also claimed of application Ser. No. 110,157 and of its fore-runners as shown above, namely of: Jan. 7, 1980; Apr. 12, 1978; Jan. 17, 1977; Mar. 8, 1971; May 18, 1966 and Dec. 5, 1963.

BACKGROUND OF THE INVENTION (a) Field of the Invention

This invention relates to hydrostatic motors, pumps and vehicles, which have revolvable members, which are driven thereby. The aim of the invention is to improve especially the motors and vehicles by adding additional arrangements to the motors which may operate independently of the main fluid flow or depending thereon and whereby arrangements are obtained, which over a one-way clutch means or over a free-wheeling arrangement or over an axially moveable member supply specific features or safeties to the respective vehicle. The vehicle itself may be a road vehicle, a waterborne vehicle or an airborne craft. The specific field of the invention deals with a twin rotor helicopter in combination with an inclinable upper structure.

(b) Description of the Prior Art

In road vehicles it has become necessary and is, in some countries, required by law, that the vehicle has a brake on the fluid motors which drive the wheels or tracks. A coupling was, therefore, mounted around the shaft of the motor and supplied with fluid for action against a spring means through the outside of the housing of the motor. The control fluid supply from radially outside through the housing is, however, inconvenient and in addition the entering fluid is prevented or braked from radial inward flow at high speed of the revolving clutch or coupling. The control devices of the known art are therefore, ineffective at high rotary speeds of the motor.

In vertically taking off and landing airborne craft, for example, in helicopters, it was common to switch the propeller blades to autorotation when an emergency landing was required. When, however, the pilot misjudged the situation or acted too late or incorrectly, it could happen that the craft would crash.

SUMMARY OF THE INVENTION

By the invention the control fluid is led through the center of the rotor and enters the to be controlled members, like coupling, clutch, wheel, propeller or others, or their control devices like small fluid motors or hydraulic or pneumatic cylinders or pistons radially from inside or in an axial direction or in an inclined direction between. These directions of control flow of the invention make the control and remote control possible also at the very highest rotary revolutions of the rotor and members. At the same time the inconvenience of fluid lines outside of the housing are prevented. The control fluid enters the motor from its axial end and thereby the control fluid lines radially of the housing are spared and radial excessive space is prevented by the invention.

It is an object of this invention to provide improvements of hydraulic or pneumatic fluid motors with control of members attached to said motors.

A specific object of the invention is to provide a control flow through a hollow rotor of a fluid motor and the means for effecting said control flow through said motor and sealing it in said motor.

Still another object of the invention is to provide a control for a variable pitch of a member or propeller associated to the fluid motor and revolved by said fluid motor.

A further specific object of the invention is to provide a control of a propeller from autorotational pitch to a stiffer angle of attack or, in other words, for a stiffer pitch when fluid under pressure enters the motor.

A still more specific object of the invention is to control the pitch of the propeller by the rate of pressure in the fluid motor.

The invention contains still further aims and objects, which are, for example:
- to provide an airtravel vehicle consisting of a structure built at least partially by fluid lines;
- to provide a propeller speed synchronization by proportionateness of rate in flow in separated flows;
- to provide over-running one way coupling means in motors or in members attached thereto;
- to provide a vehicle with inclination variation of its propellers;
- to provide an airborne vehicle with a tiltable upper structure;
- to provide a double pump set to an engine or engines for elimination of friction;
- to provide two—or multiple propeller vehicles with fluid motors; and, to provide multiple separated flow pumps with effective design for proportional or equal rate of flow delivery in separated fluid lines by effective design improvements.

But the most important object of the invention is to provide a multirotor, hydraulically driven vertical take off vehicle with substantially vertical axes of the propellers, which includes in the arrangement of the invention an automatic auto-rotation of the rotor blades, when the pressure in the main fluid lines to the propeller-driving fluid motors drops below a pre-determined value of fluid pressure.

In the preferred embodiment of this kind of vehicle, multiple propeller sets are applid with substantial vertical axes diametrically to the body and gravity center of the vehicle to keep the vehicle stable and upright in the air without tail-rotor requirement and wherein the invention applies a synchronized automatic auto rotation of all rotor blades, whan a power failure or a fluid supply failure occurs partially or entirely. The vehicle will then descend automatically to the ground as a helicopter in auto-rotation of the rotor blades, but without the need of starting of he emergency landing by autorotation actuation control.

More details will become apparent from the detailed description of the figures and of the embodiments of the invention, which are described more in detail in the following in this specification.

BRIEF DESCRIPTION OF THE DRAWING

FIG. 4 is a longitudinal sectional view through another embodiment of a fluid motor of the invention.

FIG. 5 is a partial longitudinal sectional view through another embodiment of another fluid motor of the invention.

FIG. 6 is a cross-sectional view through FIG. 5 along the line IX—IX.

DESCRIPTION OF THE PREFERRED EMBODIMENTS

Figure 1:
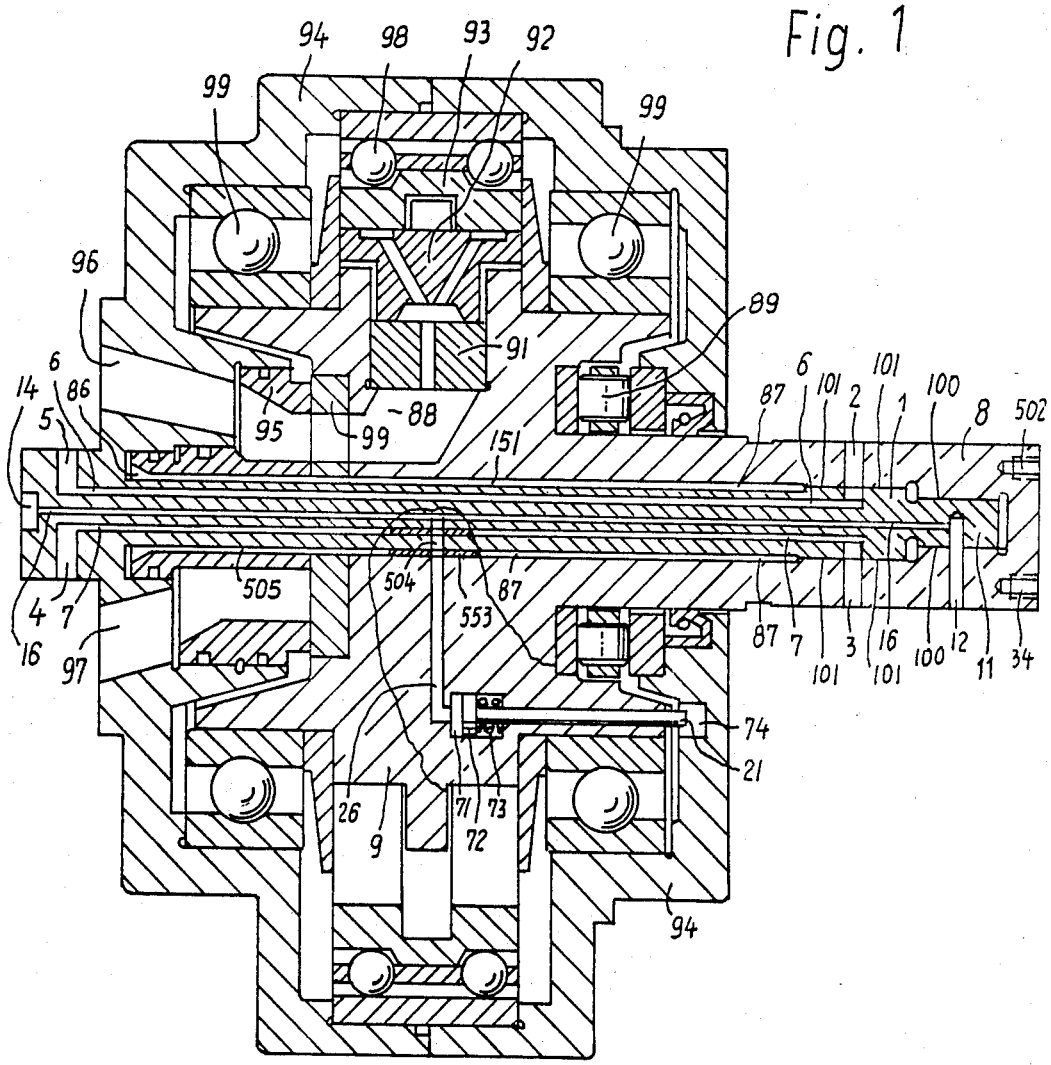
FIG. 1 is a longitudinal sectional view through a motor of an embodiment of the invention.

Referring firstly to FIG. 1, an hydraulic motor or fluid motor of the radial piston type is demonstrated. As it is known from the former art especially from U.S. Pat. Nos. 3,223,046; 3,225,706; 3,270,685; 3,277,834; 3,304,883; 3,305,195; 3,398,698; 3,468,262; 3,697,201; 3,831,496; 3,850,201; 3,889,577 or others, rotor 9 is revolvably borne in bearings 99 in housing 94. The rotor 9 contains cylinders or working chambers 88, wherein the displacement members or pistons 91 move radially inwards and outwards. Piston - shoe(s) 92 are associated to the piston(s) and radially guided by actuator 93. Actuator 93 may be a ring and be borne revolvably in bearings 93 also in housing 94. The axis of actuator 93 is distanced by an eccentricity "e" from the axis of the rotor 9, thereby causing the pistons and shoes to travel 2 times "e"=piston stroke, inwards and outwards. During outward move the pistons suction fluid through entrance port 96 and expell it through exit port 97 during the inwardly directed stroke. A fluid flow thrusting- and sealing-control body 95 may be assembled and contain passages wherethrough the fluid flows. A rotary control plate 95 may be inserted between the said thrust body 95 and the end of rotor 9 for the possibility of applying slidingly matching materials with little friction losses and high relative speed slide capability. Said rotary plate may also have passages, matching with the respective passages in the rotor 9. A thrust bearing 89 may be assembled for bearing the thrust of thrust body 95 against the rotor. Said bearing may be placed before the rotor and within the housing 94. Rotor 9 may have a shaft 8 which can be fitted to the rotor 9 or be integral therewith.

Instead of using a radial piston motor, it would also be possible to use an axial piston motor, if such rotor of the said axial piston motor has a shaft or rotor going axially through the housing 94 without inclination of the rotor axis relative to the axis of the housing. It would further be possible to use in a respective housing of the motor a radial vane machine, gear motor, trochoid motor or a vane machine of inventor's patents: U.S. Pat. Nos. 2,975,716; 3,158,103; 3,099,103; 3,111,905; 3,186,347; 3,173,375; 3,255,705; 3,246,574; 3,256,831; 3,269,329; 3,280,757; 4,184,820; 4,213,746; 3,301,232; 3,274,945; 3,263,621; 3,269,371; 3,320,898; 3,320,897; 3,379,006; 3,417,706; 3,412,686; 3,386,387; 3,416,460; 3,694,114; 3,844,685; 3,873,253 or others.

As far as it is mentioned above, that these units might be utilized in FIG. 1 it is also true that they might be used in any other housing of one or the other fluid motors of the other respective figures of the drawings of this application.

According to the invention, the rotor 9 is provided with a central rotor bore or hub parallel to the axis of the rotor 9. Said bore has referential 87. A stationary passage body 1 is inserted into bore 87 and it has a fitting portion 101 which tightly seals in a respective seal-portion in the shaft 8 or rotor 9. At the main extension however, passage body 1 and bore 87 may provide a wider clearance 86. Thrust body 95 may also have a respective bore 86, through which the passage body 1 can extend. Shaft 8 or rotor 9 may have a fluid control passage 12 extending out of said shaft 8 or rotor 9. Control fluid passage 16 may extend from control passage port 14 preferably located at the end of the housing 94, through passage body 1 to meet control fluid passage 16. Fluid for the control of a member, which may be associated to the shaft can be passed through said passages and port. Heretofore it was explained that control flow passages may be extended through or partially through the rotor or shaft. In the following it will from now on be written through the shaft or at other places it will be written through the rotor. Regardless, however, if rotor or shaft is written, it should be understood, that it can be either the shaft or the rotor. In addition there may be, but not in all cases necessary, further control fluid passages provided to extend from passage port 4 or 5 partially through passage body 1. For example, control fluid passage 6 may extend from port 5 partially through passage body 1 into control flow passage 2 which may extend out of said shaft to control another function of the member which is associated to the shaft 8 or to control an additional member associated to shaft 8. Still a further control fluid passage 7 may extend from port 4 partially through passage body 1 to meet control passage 3 for a further control of another function or member. Thus, having established at least one control fluid passage through passage body 1 to at least one control fluid control port 12, it can now, according to the invention, control at least one function of at least one member which may be fastened to shaft 8. The further control flow control parts 2 and 3, if provided, may control further functions or members. The control can now be done from stationary portions of housing 94. It is convenient to do so from the end of housing 94, as it is demonstrated in the figure. Because from the end of the housing fluid lines can be set easily to remote places for a remote control of the desired functions. The fitting portion in shaft 8 is revolving, while the passage body 1, which fits therein tightly sealing, is stationary. Stationary means relative to the housing, and so means rotary. Thus, if the housing revolves, passage body 1 revolves too, and shaft 8 and rotor 9 may then be stationary. That is the reversal of the fluid machine. Control ports and passages 2, 3, 12 may be axially distanced from each other in order to keep the respective control-flows separated from each other. It is, however, also possible, to locate them at same radial face at some axial distance, as for example, control ports 2 and 3, in order to control the control flows for exerting control functions at different rotary angles of shaft 8. Thereby different controls of members associated to shaft 8 can be controlled at different rotary angles.

For arresting the rotor 9 and shaft 8 on arresting recess 74 may be provided for example in the housing 94. An arresting pin 21 may be provided in rotor 9. The arrangement of housing and rotor might be reversed. Piston 72, associated to arresting pin 21 may be spring-loaded by spring 73 from one end and fluid pressure loaded from the other end, from chamber 71. Passage 26 may extend from one of the passages 6, 7, 16 of passage body 1 to thrust chamber 71. Thus, arresting pin 21 can be by remote control entered into arresting recess 74 for arresting the rotor 9 and shaft 8 preventing rotation of them.

Figure 1A:
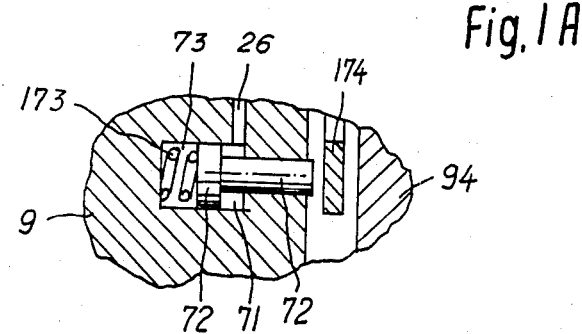
FIG. 1A shows a portion of FIG. 1 with another embodiment therein.

In FIG. 1A an opposite loading of stopper pin 72 is shown. FIG. 1A may be provided in FIG. 1 instead of the chambers, pin, spring, passage as discussed at end of last paragraph. Passage 26 may lead control fluid into thrust chamber 71 and thereby press piston 72 against spring 173 in space 73. Pin 72 is thereby taken away from arresting clutch plate or arresting portion 174. If fluid pressure leaves chamber 72, the spring 173 will press piston and pin 72 against arresting member or clutch disc 174 and said disc 74 against housing wall portion 94. Thus, the spring will automatically arrest the rotor 9 and shaft 8 at times when no fluid is supplied. That is the case, when the vehicle is resting. For starting the vehicle, fluid is entered into chamber 71 and thereby the arresting is opened, so that the rotor 9 and shaft 8 can revolve. Control passage 26 can also be extended to an main entrance port or passage of the motor. That has the effect, that the arresting assembly 173, 73, 72, 71, 26, 174, 94 opens automatically when working pressure fluid is led to the motor. It spares specific remote control of the arresting arrangement by an operator.

Figure 2:
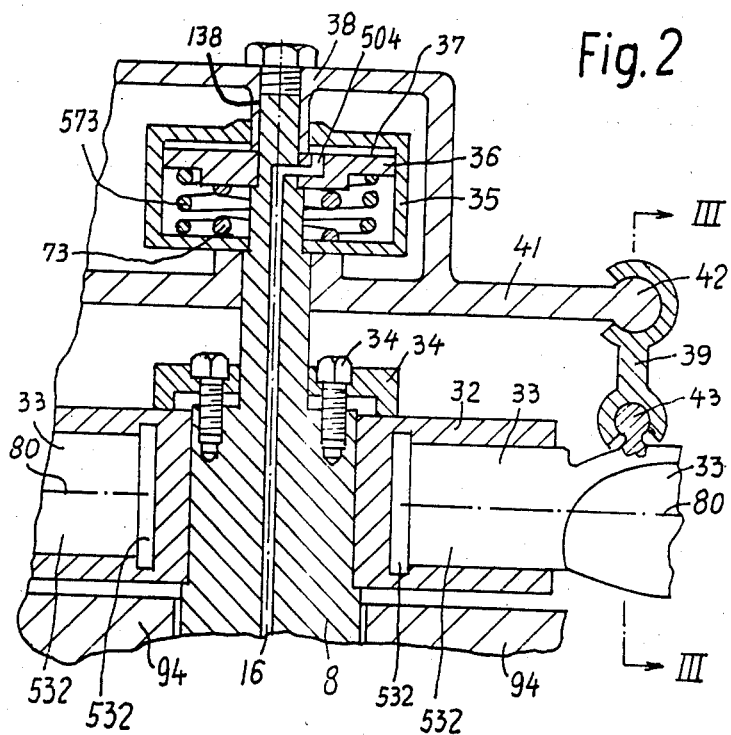
FIG. 2 shows another embodiment of control means in longitudinal sectional view.
Figure 3:
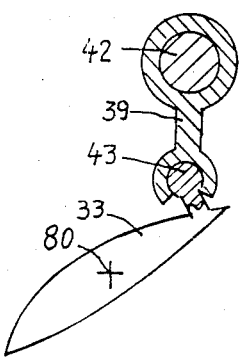
FIG. 3 is a cross-sectional view through FIG. 2 along line III—III.

In FIG. 2 and thereto belonging partial sectional view 3 a propeller holder or member holder 32 is fastened to shaft 8 by fasteners 34. Holder 32 has at least one preferably cylindrical and hollow bearing portion 33. It is preferred to set two, four or any other number of such bearing portions. Pivotable members 80 are kept in the bearing portion(s) 33 to be able to pivot therein around pivot axis (axes) 80. The pivotable member(s) 80 shown in FIGS. 2, 3 can be the feet of propellers 33. These figures further show an axially moveable control member 41 mounted to shaft 8 to be axially moveable on shaft 8. The top of FIG. 2 shows a stopper nut and the moveable member 38 is shown in the uppermost position, where it is prevented from further upwards movement by end nut 38. From end nut 38 arresting bush 138 extends along shaft portion 8 to arrest axially moveable member 36 in the uppermost position. In housing 35 the spring members 72, 73 are located to press against moveable member 36 and to press the same upwards. On top of moveable member 36 is within housing 35 the fluid pressure thrust chamber 37 provided. Passage 16, known for its functions from the discussion of FIG. 1, extends into thrust pressure fluid chamber 37. When fluid under respective pressure is led through control flow passage 16 into chamber 37, the moveable member 36 is moved from its uppermost or from a first position into a second, third or further position depending on the extent of the fluid pressure and the fluid pressure action against the spring means 73, 573. Axially moveable member 36 is fastened to moveable transmission member 41. During move of member 36 the transmission member 41 moves in unison with member 36. During this move member 41 slides along bush 138 and may be guided at this move by a portion of shaft 8. Transmission member 41 may have at least one bearing portion 42 and each pivotable member, propeller, or propeller-root of propeller blades 80, 83 may have another bearing portion 43. Pivotable or spherically swingable connection member 39 may embrace both bearing portions 42 and 43 and thereby connect moveable member 36 over member 41, bearing portion 42, connection member 39 to bearing portion 43 of the pivotable member or propeller 80, 33. Thus, when axially moveable member 36 moves, the movement is transferred to pivotable member 33, 80 to pivot the same in holding portion 32. It is preferred, that in the first, the spring loaded position, when no pressure is in chamber 37, the propeller 33 is in autorotational angle of attack, when the motor is applied in a helicopter. And to be in the starting low angle of attack position when applied to an aircraft for horizontal move. Fluid passage 16 may either be set to a high pressure main fluid line, which carries fluid to drive the motor or be set to a separated control fluid line. When communicated to the main supply fluid line, pressure in fluid in the motor, which revolves the rotor and shaft of the motor will automatically press the propellers into a position of higher angle of attack. Thus, the helicopter will lift or the aircraft will fly with speed. Any higher pressure in fluid will suplly and create a higher angle of attack of the propeller. But, when due to an engine failure or fluid line brake the pressure in chamber 37 becomes down, the springs 72, 73 will automatically set the angle of attack of the helicopter propeller into the auto rotational angle of attack. Thus, the helicopter will automatically have autorotation for an emergency landing, when the supply of driving fluid to the fluid motor fails. The embodiment of FIG. 2 of the invention, thus, supplies a high safety to fluid pressure driven helicopters and assures an autorotation even, when the pilot would fail to take action for autorotation in an emergency. FIG. 3 illustrates how axial movement of member bearing 42 effects the pivoting of pivotable member or propeller 33 around axis 80 of holding portion 32 of FIG. 2.

In FIG. 4 the upper portion in a sectional longitudinal view of another embodiment of the invention is shown.

A common hydrostatic fluid motor with a thereto provided novel combination; wherein the common fluid motor 94 provides rotatably borne in a housing 94 a rotor 108 having working chambers 88 with displacement members 91, 92, 93 for the periodic intake and expellation of fluid during each revolution of said rotor when said chambers periodically increase and decrease their volumes at said revolution while said fluid flows from an entrance port through passages in the respective chamber(s) of said working chambers and out therefrom through respective pasages over a control body 95 through an outlet port 96; and wherein said novel combination provides in combination with said common hydrostatic fluid motor; the following combination:

first: a space 151 extending through the center of the rotor 108 from one end thereof to and through the other end of the rotor, second: a revolvable shaft borne by bearings 103 radially and revolvably independently of the rotor with a rotary velocity which may become higher than the rotary velocity of the rotor and the shaft 118 extending through the space 151 of the rotor whereby the shaft 118 extends at least at one end of the motor out of the motor;

third: a one-way clutch provided between the rotor 108 and the shaft 118 which includes clutch-members 109 and a respective configuration of the faces of the shaft and of the rotor to permit a free wheeling of the shaft 118 relative to the rotor 108 in one rotary direction and to engage and fix the shaft to the rotor in the other rotary direction to drive the shaft by the rotor in the other rotary direction;

fourth: a bore 102 in the shaft 118 extending axially therethrough and into an axially extending cylinder 110 provided in the shaft 118 and open to one axial end thereof;

fifth: An axially movable piston 114 provided in the cylinder 110 with a shoulder 113 sealingly fitted in the cylinder 110 and subjected at one axial end to fluid pressure in the cylinder 110 and subjected at the other axial end thereof to a spring 116 which may be inserted in cylinder portion 115 of the cylinder 110 whereby the spring thrusts in a direction contrary to the direction of the fluid pressure onto the shoulder and the piston 113, 114;

sixth: a sealing portion 104 provided on the shaft 118 and extending into a portion of the housing 94 to seal the rotatable shaft 118 in the housing 94 even when the shaft revolves in the housing whereby the sealing portion the a control flow port 114 which is provided in the housing an separated from the motor-driving entrance and exit ports of the motor to be and remain discommunicating with the entrance and exit ports; while the control flow port 114 is communicating with the bore 102 in the shaft 118 and thereby with the cylinder 110 of the shaft 118;

seventh: a radial shoulder 119 provided on the shaft 118 and subjected to an axial thrust bearing 120 provided in the motor to prevent the escape of the shaft 118 out of the motor and its housing 94 and to provide to the shaft 118 a capability to carry an axially directed load on the shaft;

eighth: fastening means 117, 121, 122 provided on the shaft 118 to provide to the shaft 118 the capability to fasten thereon an accessory in the axial and rotary direction of the shaft 118;

whereby the motor is provided with a capability to be driven by fluid which flows through the entrance and exit ports in at least one rotary direction; to drive the shaft 118 in the rotary direction; to permit the shaft 118 to overrun the rotary velocity of the rotor 108 of the motor; to permit the piston 114 to reciprocate in the cylinder 110 in response to the pressure in the fluid in the control flow port 114 and to permit the shaft 118 to carry an axially directed load independently of the pressure in the chambers.

Rotor 108 may be borne in bearings 99 for radial load and on bearing 89 for axial load in housing 94. The housing portion 194 is provided separately on said housing 94 to permit the assembly of bearings 103 and 120. It will be fastened by bolts 152 to housing 94 after the assembly is completed. Shaft 118 may be borne in bearings 103 in housing 94 or in the rotor 108. Bearing 120 might also be provided between shaft 118 and rotor 108 instead of between the shaft and the housing. Bolts 121 may also fasten arrester 117 together with propeller flange or flange 122 on shaft 118. Arresters 117 may load the spring 116 and springs 105 may be set onto the end of the control body 95 to press it against the end face of the rotor 108 for sealing of the flow of fluid to and through and out of rotor 108.

In FIG. 5 and 6 the housing of the fluid motor, which is illustrated in FIG. 5 contains in the known way the usual arrangement including rotor 209. Rotor 209 is hollow. Shaft 205 extends from the rotor in at least one axial direction and a portion of the shaft is located in the hollow rotor 209. Overrunning one-way clutch means are provided between shaft 205 and rotor 209. They may consist of roliers or balls 202 and inclined faces 204. The shaft 205 may have a flange 228 constituting a thrust bearing to run along the thrust bearing guide face portion 229 of housing 94.

The purpose of this arrangement is to provide a one-way overrunning coupling between the rotor and the shaft. This feature is especially applied in helicopters or gyrocopters. In helicopters for autorotation of the propeller, which is associated to the shaft of the motor. Thereby acidents can be prevented because the pilot does not need any more to take care of autorotation levers. The autorotation occurs by itself when the engine fails because when the rotor 209 stops to revolve the overrun coupling means permit the shaft to continue to revolve. There are other applications of this arrangement too, but the autorotation of a helicopter is the best understood and known. In a gyrocopter the fluid motor may serve for vertical take off. Later, when the gyrocopter has obtained forward speed the propeller starts to revolve faster and runs then with faster speed than the rotor 209 does. The overrunning coupling means of these and other figures of this application assure, that the propeller and shaft can revolve faster, than rotor 209. FIG. 6 shows the generally known arrangement of a one way overrunning coupling. However, applied in this case in the hollow rotor of the motor of FIG. 5 or in the propeller bush 207 thereof.

Instead of providing the overrunning coupling means in rotor 209 of FIG. 5 it may also be applied between shaft portion 206 and bush 207 of a revolvable member or propeller 239 of the right end of FIG. 5. Hardened bush 207 may be assembled in rotor member 339. A holding means 211 can be provided and fastened to shaft 205 for holding a thrust bearing 210. Because the rotor member or revolving member 239 may be a propeller and may apply thrust which could not be borne without excessive friction, if shaft 205 stops, but bush 207 and member 239 continue to revolve.

To set the overrunning one way coupling means around shaft portion 206 as shown in the right portion of FIG. 5 is very convenient when the rotor has no space for a centrical bore for bearing the shaft portion 205 therein or when by any other reason the motor has no coupling one way means. Thus, by utilizing the arrangement of the right portion of FIG. 6 any conventional fluid motor can be provided with the external application of a one-way overrunning coupling means as in the right portion of FIG. 9. Instead of providing the overrunning coupling means only in the rotor 209 or only in the external bush 207, both applications can be applied as shown in FIG. 5; i.e. one-way coupling in the rotor 209 and another in the bush or revolvable member 207 or 239. This arrangement also shown only in FIG. 5 may similarly be applied in any other suitable fluid motor.

Figure 7:
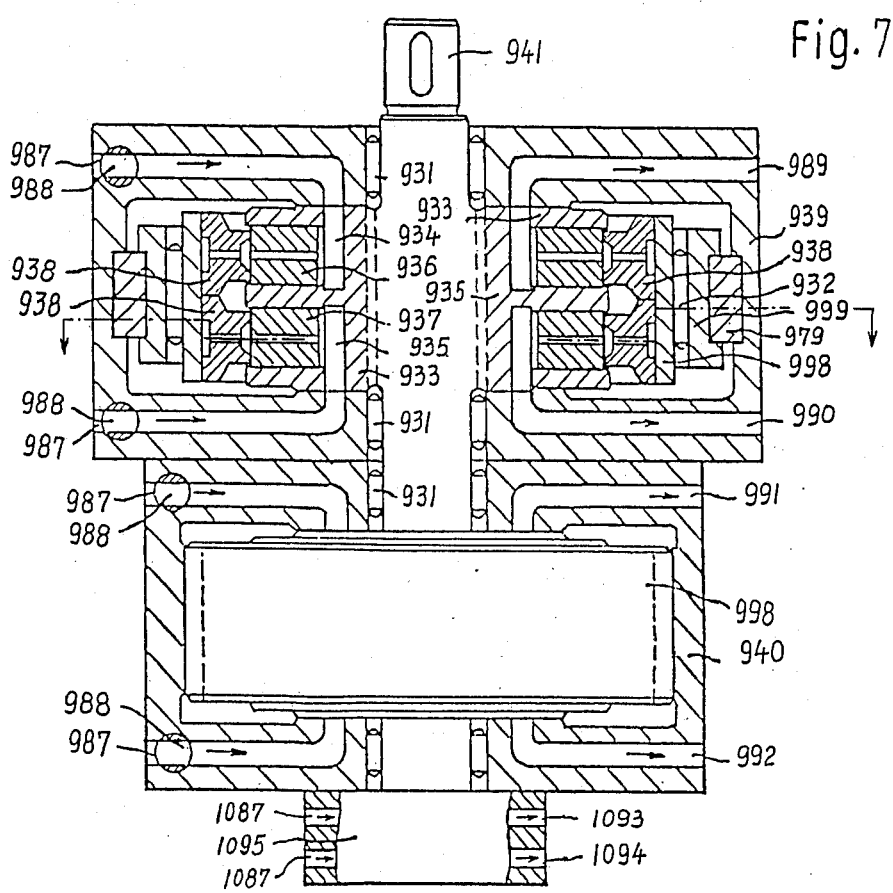
FIG. 7 is a sectional view through a pump means of the invention.
Figure 8:
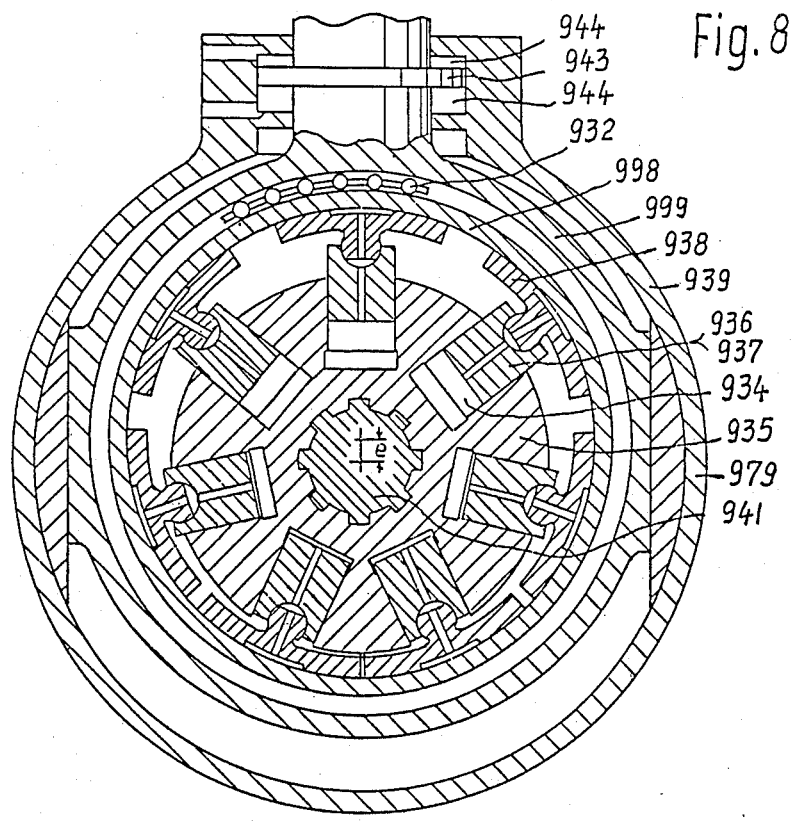
FIG. 8 is a cross sectional view through FIG. 7 along the arrowed line of FIG. 7.

In FIGS. 7 and 8, a pump which produces four fluid flows is represented, which may advantageously be used in vehicles designed in accordance with the invention. The unit comprises two two-flow pumps mounted axially in tandem on a common shaft of which one is controllable within certain limits as to its delivery so that two and two of the produced flows have rates of flows which are equal or in a fixed proportion to each other. The housings 939 and 940 are flanged to each other, and the shaft 941 carrying the rotors is rotatably mounted in bearings 931 provided in both of the housings. Each of the housings encloses one rotor 933, and each rotor 933 is formed with two groups of delivery chambers or cylinders 934 and 935 in which pistons 936 and 937 are reciprocated by means of a reaction ring 998 with interposed piston shoes 938.

Body portions 1333 of the rotor or fluid handling body 933 remain uninterrupted between two neighboring working chamber groups 934 and 935 for the separation of the respective working chamber groups 934 and 935 from each other. A stroke adjustment slide block 999 surrounding the reaction ring 998 with an interposed bearing 932 is displaceable, within certain limits, along guides 979, whereby the stroke of the pistons may be varied to a limited extent. Each of the mentioned rotors 933 has a medial uninterrupted portion 1333 between the respective two neighboring working chamber groups 934 and 935 for the separation of the respective working chamber groups from each other. Thereby the groups of cylinders 934 and 935 are completely separated from each other, and each group has its own fluid inlet passage 987 and fluid outlet passage 989 to 992 respectively. The pressure fluid inlet and outlet passages cannot communicate with each other. Flow volume regulators 988 may be mounted in the inlet passages in case that the stroke adjusting slide block 979, 999 is not provided. The other housing 940 encloses the same members, i.e., the rotor block with groups of cylinders, pistons, piston shoes, and only the reaction ring 998 is not adjustable. In the figure, this reaction ring 998 is shown in an elevational view. The part mounted in the housing 940 has its own inlet passages 987, if necessary, with flow regulators 988 mounted therein and two mutually separated and non-communicating fluid outlet passages 991 and 992. A priming device 1095 having inlets 1087 and two separate outlets 1093 and 1094 may be provided at the end of the pump. In this case, the outlets 1093 and 1094 lead to the inlets of the main pump. The outlet passages 990, 991 and 992 are connected each to one of the hydraulic motors of the vehicle through pressure fluid lines. Owing to this arrangement, a fixed proportionality, in particular equality, of the rates of flow in all of the four circuits is assured, with two of the flows being jointly adjustable.

Figure 9:
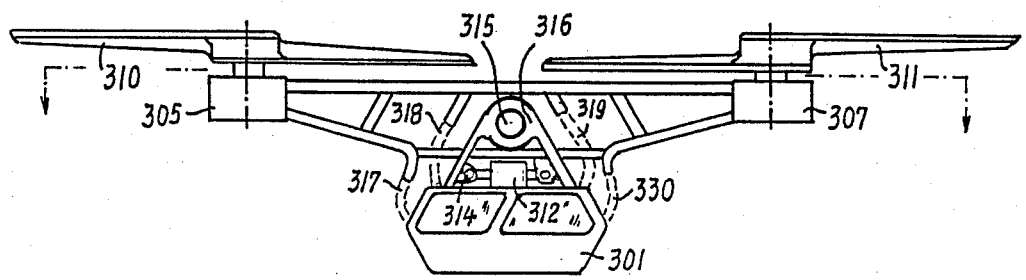
FIG. 9 shows still another embodiment of an aircraft of the invention; seen again from the side.
Figure 10:
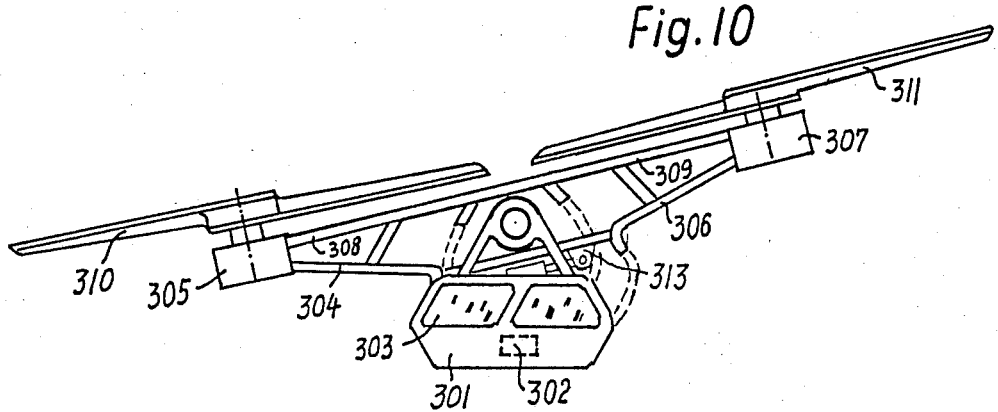
FIG. 10 shows the craft of FIG. 18 in another flight situation.

FIG. 9 and FIG. 10 show another vehicle of the invention seen from the side, both in different flight situations. A fluid motors and propellers carrying structure, preferably to be made up by the fluid pipes to prevent unnecessary weight, is the upper portion of the vehicle. This upper portion is provided with a hanging means 315 whereon the bottom portion hangs by hanging member 316. Hanging means 315 and 316 provide an ability to pivot relative to each other, whereby it is made possible, that the upper body inclines relative to the bottom portion of the craft or the bottom portion of the craft inclines relative to the upper body structure of the craft. An inclination control means 312 is associated to the upper body structure and to the bottom portion of the vehicle. It may be swingable fastened to the bottom portion by swing holder 313 and to the upper body structure by swing holder 314 with length adjuster 312 therebetween. The upper body structure consists preferably of fluid line 304 to the front motor 305, return fluid line 308 from the front motor to the pump means or to the tank and further of the fluid line 306 to the rear motor 307 and the return fluid line 309 therefrom to the tank or pump means. Ribs may be added to the fluid lines to supply respective stability to the fluid line frame. Instead of fluid pipes any other structure might be used, but to build the upper body structure by the main fluid lines as pipes makes the least weight and economical vehicle. In order to make the inclination between upper body structure and bottom portion of the vehicle possible, either swing connections are set within the main fluid lines and return lines, or, as shown in the drawing, flexible fluid hoses 317, 318, 319 and 320 are set from each one of the supply fluid lines and return fluid lines to the fluid tank or to the fluid flow supply means 302 in the bottom portion or any other suitable place of location in the vehicle.

Fluid flow supply means 302 is associated to a power plant and supplies preferably at least two flows of separated flows of proportionate or equal rate of flow. This separateness of flows and proportional rates of flow assures that the front motor and the rear motor 305 and 307 at all times revolve with to each other proportionate or equal rotary velocity and thereby so do the front propeller 310 and the rear propeller 311. This proportionateness of rotary angular velocity of the propellers assures a good balance of lift of the front portion and of the rear portion of the vehicle. The bottom portion, hanging below the pivotable hanger 315, 316 and carrying the heaviest weight, like power plant, pumps means, tanks and passengers or pilot provides the gravity center below the hanging means. Said gravity center is formed by the weights of the bottom portion and is at all times at steady flight below the hanging center 315. It is tracted by the force of gravity of the earth straight vertically downwards below the hanging center 315. Thus, when the upper body structure is adjusted to a normal rectangular position relative to the bottom portion, the craft is ready to climb vertically or to descend vertically. But when, by actuating the inclination controller 312, the upper body structure is inclined forward or backward, the vehicle flies correspondingly forward or backward. The inclination controller acts steplessly and thereby a steplessly variable inclination of the upper body structure of the craft can be materialized. Thereby any desired ratio between forward or backward thrust and lift can be obtained. The flexible fluid lines, namely fluid pressure hoses 317 to 320 form an important part of the assembly because they make the inclination between upper and bottom portions possible in combination with pivotable hanging 315, 316 in the most convenient and most inexpensive way. The craft has been built and can be seen at applicant's research institute. Side rudders or turn rudders or stabilizers may be added to the craft upon wish. The power supply unit of applicant's U.S. Pat. No. 4,009,849 can supply a double power and fluid flow supply plant for an added safety measure.

Figure 11:
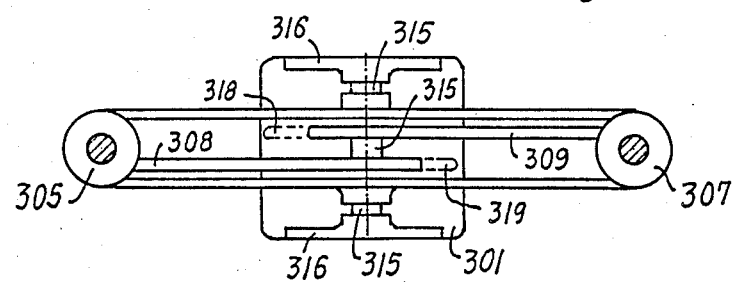
FIG. 11 is a sectional view through FIG. 9 along the arrowed line of FIG. 9.

FIG. 11 illustrates the vehicle of FIG. 9 in a sectional view along the arrowed line of FIG. 9 and thereby shows the main portions of the vehicle of FIG. 9 seen from above. FIG. 11 is provided to see the pin 315, which molds the bottom portion and the upper structure together and wherearound the upper structure can be pivited, in a longitudinal view. This Figure also illustrates how the fluid lines 308 and 309 are seen from above and how they port into the flexible lines 318 and 319. Since the arrowed line in FIG. 9 goes through the shafts of the fluid motors, these shafts are seen in sectional view in FIG. 11.

FIGS. 1 to 8 illustrate pumps or motors which may selectively applied in the vehicle of FIG. 9 to drive the propellers of the Figure.

What is claimed is:

1. A fluidborne craft, comprising, in combination, a upper portion and a bottom portion witha pivotable movement permitting holding means between said upper and bottom portion,
    wherein said upper portion is provided with at least two propellers and said bottom portion is provided with a body, a cabin and a power plant,
    wherein a transmission means is provided between said power plant and said propeller,
    wherein inclination control means are provided to incline said upper portion relative to said bottom portion,
    wherein said upper portion is a fluid pipe structure which carries thereon front and rear fluid motors,
    wherein said power plant drives a fluid flows creation means, said transmission means include fluid lines from the outlets of said fluid flow creation means to the inlets of said fluid motors,
    wherein flexible fluid line portions are provided between the respective fluid line portions of said upper and bottom portions of said vehicle,
    wherein said upper portion is a pipe structure in which said pipes are portions of said fluid lines,
    wherein said pipes of said upper structure hold on their outer ends said front and rear motors individually, and;
    wherein said pivotal movement permitting holding means includes bearing portions and a shaft therein while said control means is a piston in a fluid cylinder with said piston and cylinder connected to said upper and bottom portions respectively and the length of the stroke of said piston is limited to prevent too stiff an angle of inclination of said upper structure relative to said bottom portion.

2. A fluidborne craft, comprising, in combination, a upper portion and a bottom portion with a pivotable movement permitting holding means between said upper and bottom portions,
    wherein said upper portion is provided with at least four propellers and said bottom portion is provided with a body, a cabin and a power plant,
    wherein a transmission means is provided between said power plant and said propeller,
    wherein inclination control means are provided to incline said upper portion relative to said bottom portion,
    wherein said upper portion is a fluid pipe structure which carries thereon front and rear fluid motors,
    wherein said power plant drives a fluid flows creation means, said transmission means include fluid lines from the outlets of said fluid flow creation means to the inlets of said fluid motors,
    wherein flexible fluid line portions are provided between the respective fluid line portions of said upper and bottom portions of said vehicle,
    wherein said fluid flow producing means supplies four independent flows of fluid which are separately led through four separated fluid lines to four separated motors of said upper portion,
    wherein said four motors of said upper portion includes two front motors and two rear motors,
    wherein said upper portion is a pipe structure in which said pipes are portions of said fluid lines,
    wherein said pipes of said upper structure hold on their outer ends said front and rear motors individually, and;
    wherein said pivotal movement permitting holding means includes bearing portions and a shaft therein while said control means is a piston in a fluid cylinder with said piston and cylinder connected to said upper and bottom poritons respectively and the length of the stroke of said piston is limited to prevent too stiff an angle of inclination of said upper structure relative to said bottom portion.

3. The craft of claim 2,
    wherein said pipes include individual delivery fluid lines and individual return fluid lines with said delivery fluid lines permanently and exclusively passing high pressure fluid to said motors while said return fluid lines exclusively and permanently return fluid from said motors at least indirectly to said fluid flow creation means, wherein said holding means is a pin which is with its axis directed perpendicular to the plane between the axes of said motors borne in bearings on said bottom portion while it extends through at least one bearing on said upper structure, and, wherein said pin is closely fitted in said bearings to direct said pivotal movement around said axis of said pin and thereby to limit the direction of inclination of said upper structure relative to said bottom portion exclusively in the direction of the fligh path of said fluidborne craft.

4. A fluidborne craft, comprising, in combination, a upper portion and a bottom portion with a pivotable movement permitting holding means between said upper and bottom portions, wherein said upper portion is provided with at least two propellers and said bottom portion is provided with a body, a cabin and a power plant, wherein a transmission means is provided between said power plant and said propeller, wherein inclination control means are provided to incline said upper portion relative to said bottom portion, wherein said upper portion is a fluid pipe structure which carries thereon front and rear fluid motors, wherein said power plant drives a fluid flows creation means, said transmission means include fluid lines from the outlets of said fluid flow creation means to the inlets of said fluid motors, wherein flexible fluid line portions are provided between the respective fluid line portions of said upper and bottom portions of said vehicle, wherein said upper portion is a pipe structure in which said pipes are portions of said fluid lines, wherein said pipes of said upper structure hold on their outer ends said front and rear motors individually, and;

wherein said pivotal movement permitting holding means includes bearing portions and a shaft therein while said control means is a piston in a fluid cylinder with said piston and cylinder connected to said upper and bottom portions respectively and the length of the stroke of said piston is limited to prevent too stiff an angle of inclination of said upper structure relative to said bottom portion wherein said pipes include individual delivery fluid lines and individual return fluid lines with said delivery fluid lines permanently and exclusively passing high pressure fluid to said motors while said return fluid lines exclusively and permanently return fluid from said motors at least indirectly to said fluid flow creation means, wherein said holding means is a pin which is with its axis directed perpendicular to the plane between the axes of said motors borne in bearings on said bottom portion while it extends through at least one bearing on said upper structure, and, wherein said pin is closely fitted in said bearings to direct said pivotal movement around said axis of said pin and thereby to limit the direction of inclination of said upper structure relative to said bottom portion exclusively in the direction of the fligh path of said fluidborne craft.

5. The craft of claim 4, wherein the weight of said upper structure including the weight of said motors is less than twenty-six percent of the total lift of the empty craft of said fluidborne craft at hovering, whereby the ability to carry a load is greater in said craft then it would be if the power of said plant would be transfered to a single propeller of equal dimensions on top of said craft.

6. The craft of claim 3, wherein the weight of said upper structure including the weight of said motors is less than fifty-nine percent of the total lift of the empty craft of said fluidborne craft at hovering, whereby the ability to carry a load is greater in said craft then it would be if the power of said plant would be transfered to a single propeller of equal dimensions on top of said craft.

* * * * *